July 14, 1964
D. I. PACKARD
3,140,850
VEHICLE TIE DOWN APPARATUS
Filed April 29, 1963
6 Sheets-Sheet 1
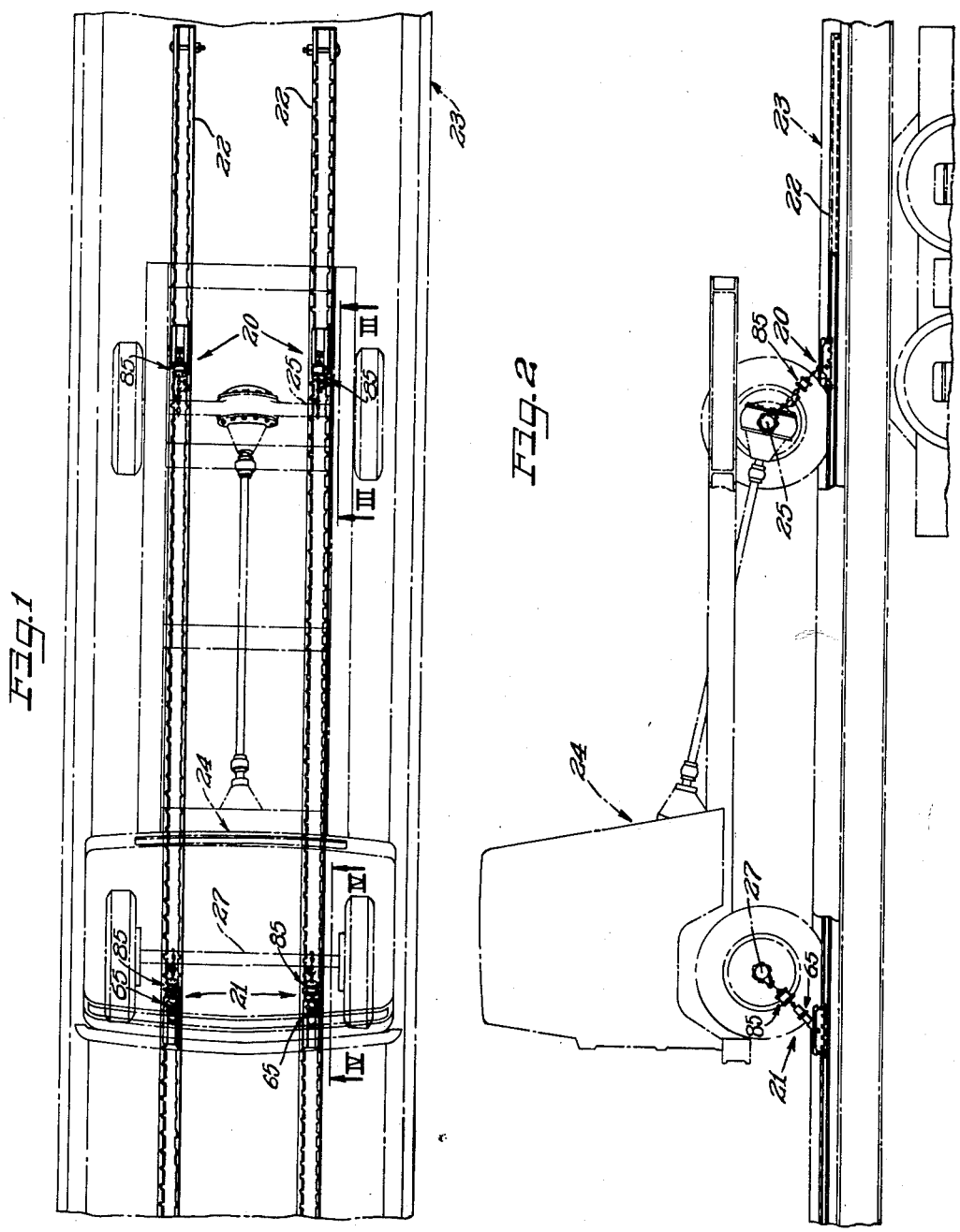
INVENTOR.
Durward I. Packard
BY
Hill, Sherman, Meroni, Gross & Simpson
ATTORNEYS July 14, 1964

D. I. PACKARD 3,140,850

VEHICLE TIE DOWN APPARATUS

Filed April 29, 1963

INVENTOR.
Durward I. Packard
BY
Hill, Sherman, Meroni, Gross & Simpson
ATTORNEYS

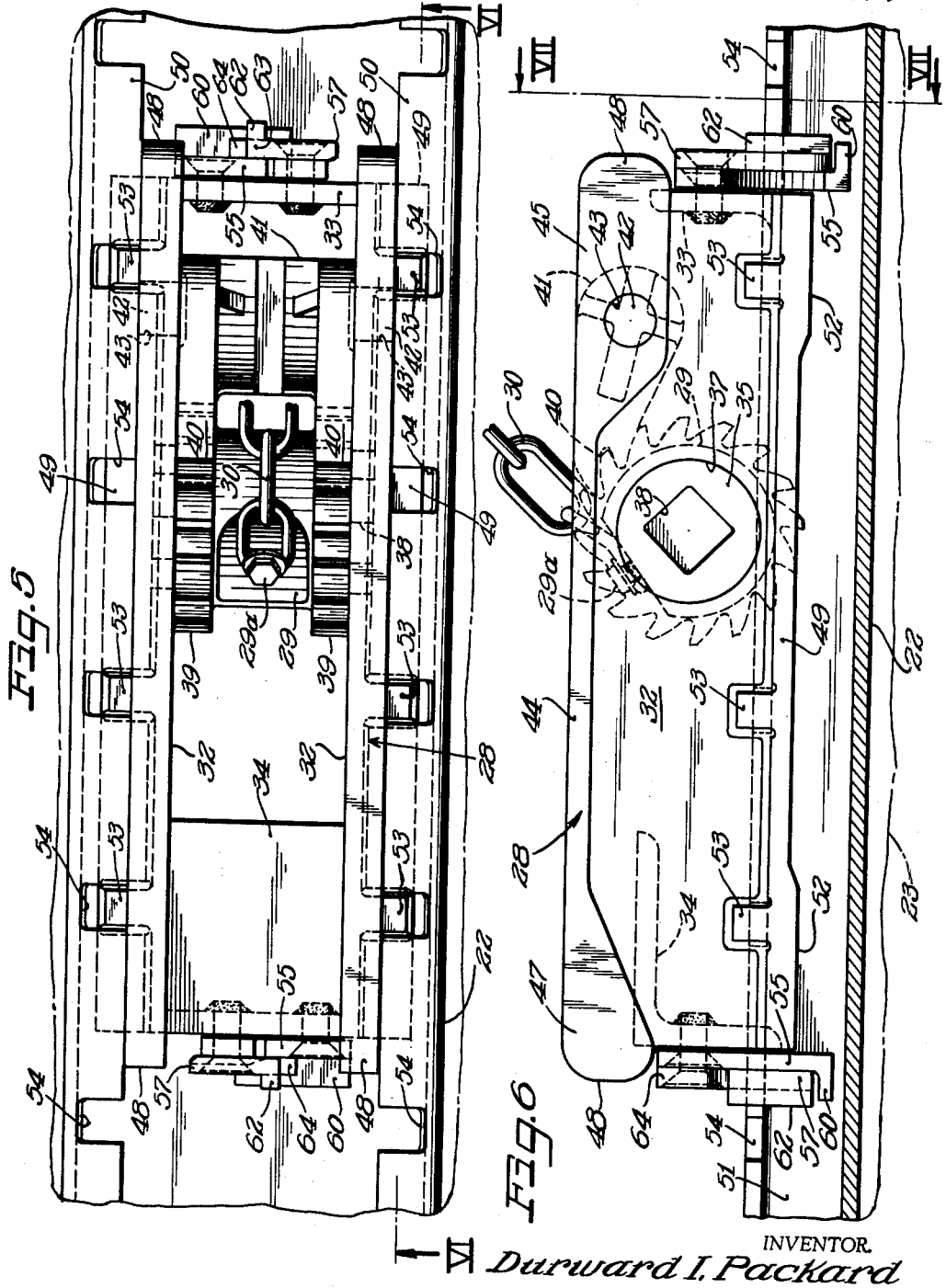

July 14, 1964

D. I. PACKARD 3,140,850

VEHICLE TIE DOWN APPARATUS

Filed April 29, 1963

INVENTOR.
Durward I. Packard
BY
Hill, Sherman, Meroni, Gross & Simpson
ATTORNEYS

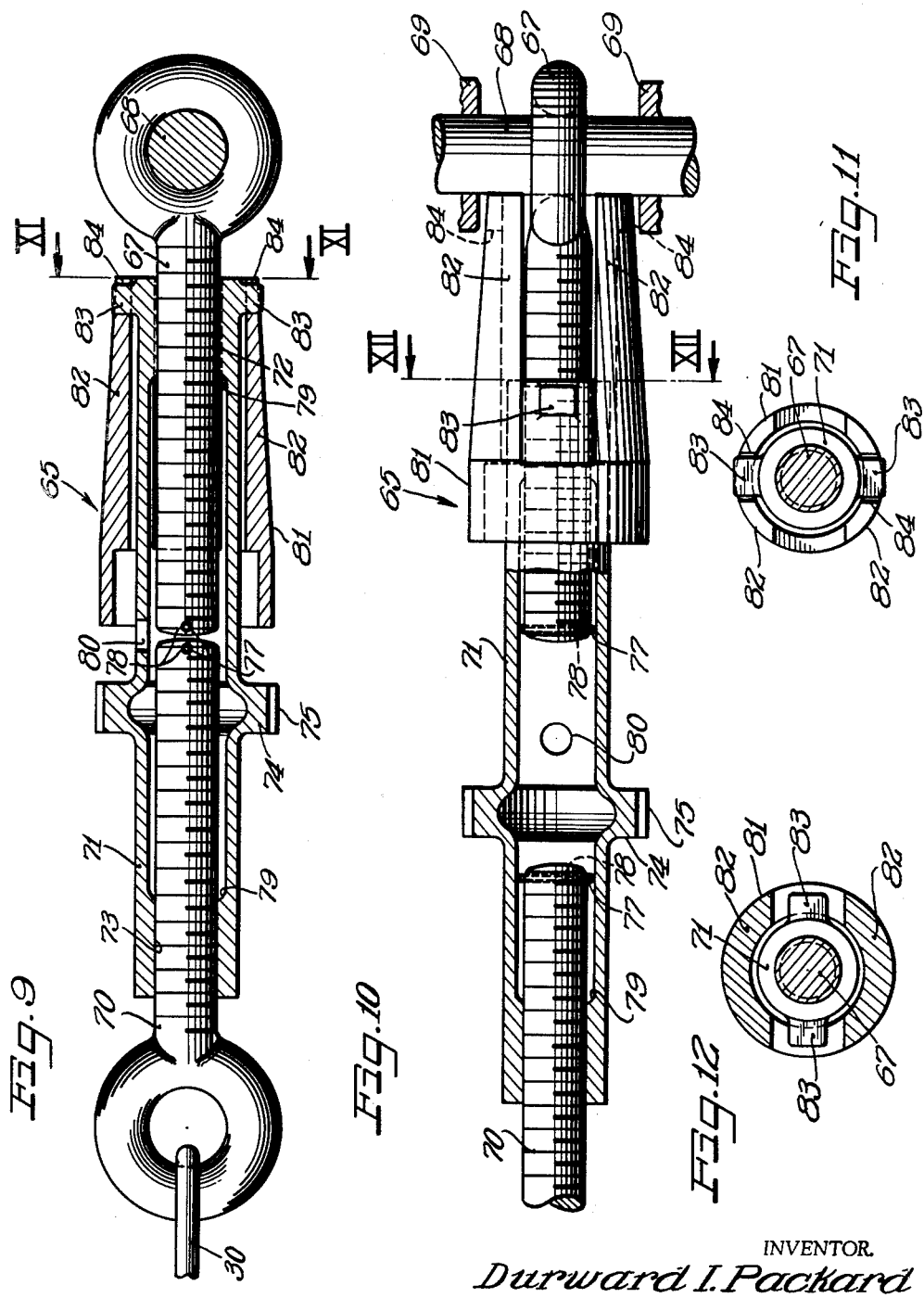

July 14, 1964

D. I. PACKARD 3,140,850

VEHICLE TIE DOWN APPARATUS

Filed April 29, 1963

INVENTOR.
Durward I. Packard
BY
Hill, Sherman, Meroni, Gross & Simpson
ATTORNEYS

United States Patent Office 3,140,850
Patented July 14, 1964

3,140,850
VEHICLE TIE DOWN APPARATUS
Durward I. Packard, Kenilworth, Ill., assignor to Brandon Equipment Company, Inc., Chicago, Ill., a corporation of Delaware
Filed Apr. 29, 1963, Ser. No. 276,371
12 Claims. (Cl. 248—361)

The present invention relates to improvements in apparatus for securing vehicles such as trucks and the like in place on railroad cars and the like for transportation.

Various problems are encountered in securing vehicles such as automotive trucks in place on railway flat cars and the like for transportation, among which may be mentioned the attainment of ruggedness in the tie down equipment but nevertheless ease of adjustment to accommodate variable lengths and height relationships in the vehicles, retaining of the tie down devices in position in spite of jostlings to which subjected in service, provision for shock absorption, and the attainment of all these features in a simple and economical structure.

An important object of the present invention is to provide tie down apparatus which will efficiently and satisfactorily meet all of the enumerated and other problems encountered with the use of this type of apparatus.

Another object of the invention is to provide new and improved tie down means especially suitable for use in transportation of automotive trucks on railway flat cars and the like.

A further object of the invention is to provide a new and improved heavy duty vehicle tie down structure which is especially suitable for securing automotive trucks in place on railway cars for transportation.

Still another object of the invention is to provide novel quick releasable but positive holding supporting latch means for maintaining the anchoring blocks of the tie down apparatus in adjusted position along an anchor channel.

A still further object of the invention is to provide in vehicle tie down apparatus new and improved adjustment take-up means.

It is yet another object of the invention to provide new and improved shock absorbing connecting means in vehicle tie down apparatus.

Other features, objects and advantages of the present invention will be readily apparent from the following detailed description of certain preferred embodiments thereof taken in conjunction with the accompanying drawings, in which:

FIGURE 1 is a diagrammatic top plan view of a vehicle tie down apparatus according to the present invention and showing a vehicle and a railway flat car in phantom outline;

FIGURE 2 is a side elevational view of the apparatus of FIGURE 1, with certain parts broken away and in section to show details of relationship of the assembly;

FIGURE 5 is a top plan view of one of the anchoring units;

FIGURE 6 is a side elevational view of the anchoring unit taken substantially along the line VI—VI of FIGURE 5;

FIGURE 9 is a longitudinal sectional elevational view through one of the screw-type tightening adjustment members;

FIGURE 10 is a longitudinal sectional detail view of the same screw-type adjustment member but looking at the same 90° around from the illustration in FIGURE 9 and disclosing the several elements in different relative adjusted relationships;

FIGURE 11 is a sectional elevational detail view taken substantially on the line XI—XI of FIGURE 9;

FIGURE 12 is a sectional elevational detail view taken substantially on the line XII—XII of FIGURE 10;

Figure 3:
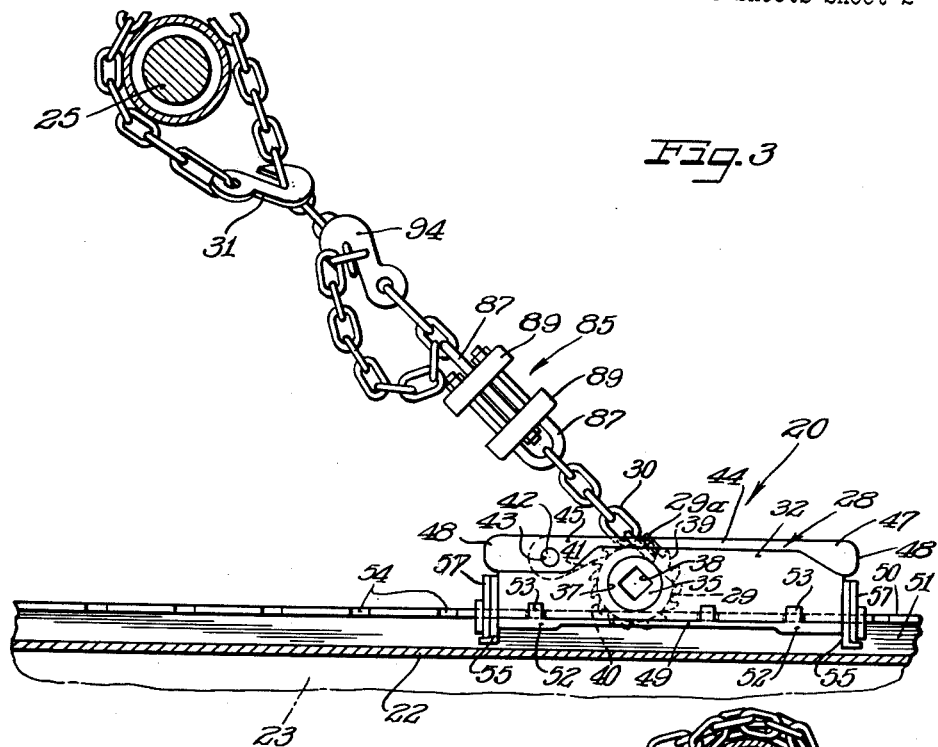
FIGURE 3 is an enlarged fragmentary sectional elevational view taken substantially on the line III—III of FIGURE 1.

In FIGURES 1 and 2, the invention is depicted as embodied in tie down structure including sets of anchoring devices 20 and 21 mounted in heavy duty longitudinally extending spaced parallel retaining channels 22 on a railway flat car 23 and constructed and arranged to retain an automotive vehicle such as a truck 24 in place on the flat car for transportation. It will be observed that the anchoring channels 22 are in such spaced relation as to enable straddling thereof by the truck 24 extending longitudinally so that respective rear and front axles 25 and 27 of the truck extend across the rails 22 at the normal elevation as maintained by the wheels of the truck. In this instance the anchoring units 20 are secured to the rear axle 25 and the anchoring units 21 are secured to the front axle 27 of the truck.

Each of the anchoring units 20 comprises a rigid anchor block body 28 engaged with one of the respective channels 22 (FIGS. 3, 5 and 6) rotatably mounting a winch drum 29 having suitably secured thereto as by means of a bolt 29a an anchoring chain 30 of suitable length and weight and to the opposite end of which is attached a grab hook 31 by which the end of the chain is secured to itself after the end portion has been wrapped around the vehicle axle, substantially as shown in FIGURE 3.

In an efficient construction, each of the anchor blocks 28 is in the form of a generally rectangular frame having elongated spaced parallel side walls 32 with their substantial width vertical and connected together at their opposite ends by respective front and rear rigid cross bars 33 and 34, respectively, by which the opposite walls 32 are rigidly secured together. Although if preferred the entire anchor member frame may be cast or forged in one piece, the sides 32 may be as shown formed as castings or forgings of suitable material and the end bars 33 and 34 comprise pieces of angle bar welded to the inner faces of the side walls 32 and providing vertical end walls for the ends of the anchor block member.

Each of the winch members 29 comprises a drum having opposite end respective journals 35 rotatably engaged in respective bearing bores 37 aligned in the side wall portions 32. Turning of the winch drum is facilitated by means enabling engagement therewith of a suitable crank, in this instance comprising rectangular axial socket means 38 comprising a socket extending in from either or both of the journals 35 or extending entirely through the drum from end-to-end.

In the arrangement shown, means for retaining the winch drum in chain tensioning wound up adjusted position comprises a pair of rotary ratchets 39, preferably formed integrally therewith at opposite ends, serving to oppose the inner surfaces of the side wall frame members 32 for maintaining the drum in its endwise or axial centered disposition within the frame and having the teeth thereof oriented for releasable engagement with respective pawl fingers 40 of a pawl member 41 having its body of a width to be freely swingably received between the inner faces of the side wall frame members 32 and provided with aligned oppositely projecting jounrals 42 engaged rotatably in bearing bores 42 aligned in the upper front portions of the side wall members. Thereby the pawl member 41 is located in the upper portion of the anchor block member where it is readily accessible for manipulation into and out of retaining inter-engagement with the ratchets 39. Normally, of course, the pawl member 41 is gravitationally biased to swing the fingers 40 toward and into engagement with the complementary ratchet teeth. If it is desired, for any reason, to disable the pawl 41, it can be swung over away from the winch drum to rest upon the adjacent upper edge of the vertical flange of the end bar 33.

For maximum strength and ruggedness, with minimum weight of material and thus economical construction both from the standpoint of initial cost and from the dead load standpoint, each of the complementary side wall portions 32 of the anchor block member 28 is constructed as a panel of minimum thickness throughout its major area, consistent wth heavy duty usage, and each provided with an upper marginal outwardly projecting reinforcing rib flange 44 of relatively narrow width throughout the major extent of its length but widening to respective front and rear end buffer portions 45 and 47, respectively. Each of the buffer portions 45 and 47 projects a limited distance beyond its end of the side wall panel as best seen in FIGURES 3 and 6, to afford buffer projections 48 which are desirably rounded off in elevation and afford convenient means against which a mallet or other driving tool may be applied for inching the anchoring member into position, if desired.

Figure 7:
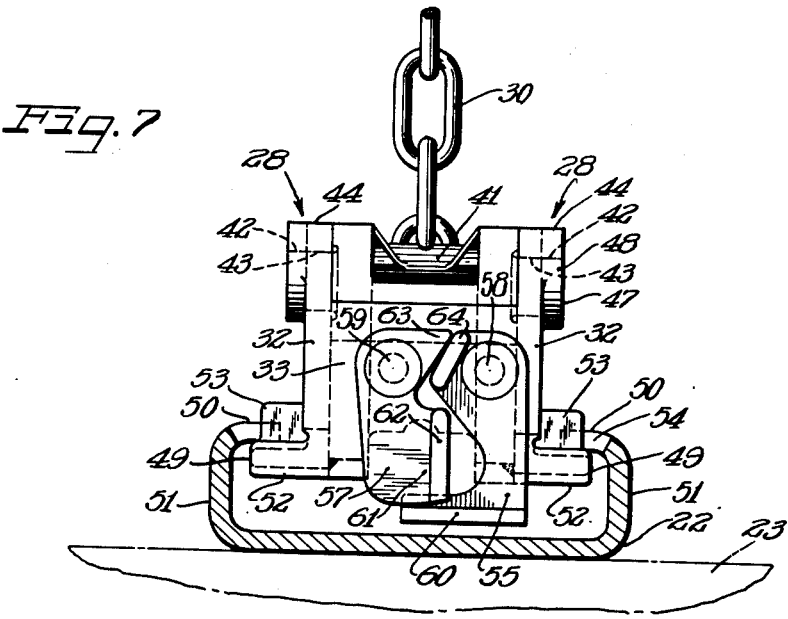
FIGURE 7 is an end elevational sectional view taken substantially on the line VII—VII of FIGURE 6.
Figure 8:
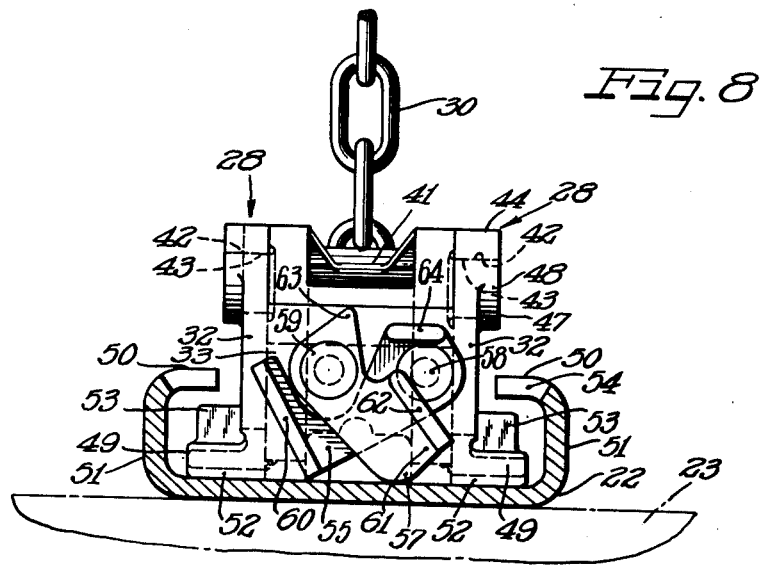
FIGURE 8 is a view similar to FIGURE 7 but showing the parts in a different relative position, namely when the anchoring member is released for adjustment longitudinally of the channel.
Figure 13:
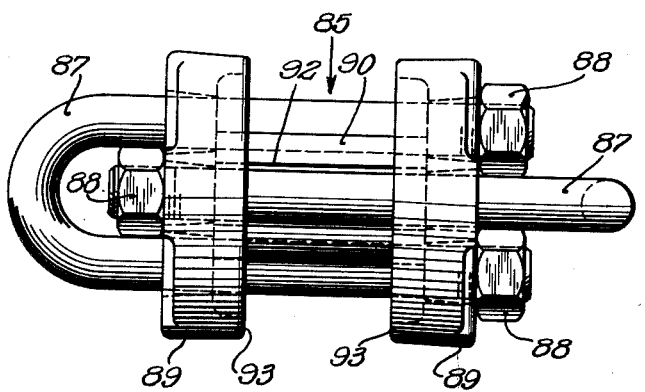
FIGURE 13 is a side elevational view of one of the shock absorbing tension members of the apparatus.

Along its lower margin each of the side wall panel portions 32 has an outwardly projecting longitudinal reinforcing and anchoring flange 49 extending the full length of the panel, of relatively narrow width but of a length such that the distance between the outer edges of the oppositely projecting lower reinforcing and base flanges of the unit is greater than the distance between the edges of coplanar spaced, inturned interlock flanges 50 of the associated anchoring channel 22, but less than the distance between the inner opposed faces of upwardly projecting integral spacer flanges 51 of the channel, as best seen in FIGS. 5, 7 and 8. Above the lower marginal reinforcing and anchoring flanges 49 and at least to the undersides of the respective upper marginal reinforcing flanges 44, the outer faces of the side wall panels 32 are spaced apart sufficiently less than the inwardly directed and opposed edges of the interlock flanges 50 for free clearance whereby when the anchor member 28 rests on the base of the channel 22, as seen in FIGURE 8, it can be freely moved longitudinally along the channel. In order to limit frictional drag in such movement, the lower edges of the wall panels 32, and in this instance inclusive of the reinforcing flanges 49, are provided with limited downwardly projecting contact pad areas 52 adjacent the opposite ends and coplanar for engaging the opposing upper face of the lower flange of the channel 22.

Upon upward displacement of the anchoring member 28, the upper sides of the lower reinforcing and anchoring flanges 49 engage against the undersides of the interlock flanges 50 for anchorage purposes, it being understood, of course, that the channels 22 are secured in suitable manner as by means of bolts, welding, or the like, to the supporting bed of the railway car 23 or the like. At the same time, combination interlock and reinforcing projections or anchoring lugs 53 formed integral with and extending outwardly from the respective wall panels 32 and upwardly from the bottom reinforcing and anchoring flanges 49, engage in interlock notches 54 provided for this purpose in the free margins of the interlock flanges 50. As best seen in FIGURES 3, 5-7, a plurality of transversely aligned pairs of the anchoring lugs 53 is provided along the flange 49, complementary in spacing to the transversely aligned pairs of interlock notches 54, whereby longitudinal stresses are well distributed over a substantial portion of the longitudinal extent of the interlock flanges 50 against longitudinal pull exerted on the anchor member 28. At the same time, the anchoring lugs 53 afford substantial reinforcement at spaced intervals along the anchoring flanges 49 whereby efficiently to resist even severe stresses imposed against the flanges 49 by upward pull and jerking on the anchor member 28 in service.

It will be observed that the winch drum 29 is located as nearly as practicable adjacent the longitudinal center of the anchoring member 28, but slightly offset toward the front end of the member whereby only one transverse set of the reinforcing and anchoring lugs 53 is eliminated to accommodate the bearing bores 37. Hence, generally upward and forward pull on the anchor member 28 in service through the chain 30 draws the reinforcing and anchor flanges 49 substantially uniformly up against the undersides of the interlock flanges 50.

Through the arrangement of the interlock notches 54 at substantially uniform intervals spaced longitudinally entirely along the channels 22, accurate incremental adjustment of the anchor members 28 therealong is facilitated by registering of the lugs 53 with the notches 54 at the selected location for the anchoring member 28 as preferred.

In order to assure that the anchoring member 28 will not leave its adjusted position longitudinally of the channel 22 as determined by interengagement of the anchoring lugs 53 in the interlock notches 54, safety hold-up means are provided operable to prevent dropping of the anchoring member 28 from an adjusted anchored relation to the channel 22 to an extent which will disengage the lugs 53 from the notches 54. For this purpose, a device is provided, preferably at each end of the anchoring member as seen in FIGURES 3, 5 and 6 and comprising a pair of coactive, generally overlapping the related, swingably mounted lever plates 55 and 57 (FIGS. 7 and 8). Herein, the plate 55 comprises an automatic safety latch and the plate 57 comprises a gravity lock. Respective rivet studs 58 and 59 provide pivotal connections for upper end portions of the members 55 and 57 to the respective end face of the anchor member 28. On its lower end, the safety latch member 55 has an outwardly projecting horizontal foot flange 60 which, when the member is hanging downwardly opposes the base of the channel 22 normally spaced slightly thereabove when the anchor member is pulled all the way up to engage the flanges 49 with the channel flanges 50, but in less spaced relation than the height of the retaining lugs 53 above the upper face of the adjoining flange 49. Hence, if for any reason such as looseness in the connecting chain or yielding of the anchored vehicle there is a tendency for the anchoring member 28 to drop, the safety latch will hold it up against escape of the lugs 53 from the notches 54 within which engaged. In the depending, hanging position of the safety latch member 55, the gravity lock member, also hanging downwardly, has its lower edge lockingly overlying the foot flange 60, and the construction and relationship of the members 55 and 57 is such that normal in-service jostlings will not dislodge the members from their interlock relationship wherein the latch member 55 is maintained in its depending latching relation to the associated end of the anchoring member 28. For this purpose, the lock member 57 is provided with a gravity biasing eccentric portion 61 carrying a vertical outwardly projecting rib 62 and tending normally to cause the member 57 to swing about its pivot in a clockwise direction as viewed in FIGURE 7. On its upper end portion, the member 57 has a stop head projection 63 directed toward an outwardly projecting stop flange 64 on the head portion of the latch member 55, whereby the lock member 57 is held in its locking relation to the member 55 and more particularly to the foot flange 60.

When it is desired to release the safety latch for dropping the anchor member 28 to the bottom of the channel 22, as seen in FIGURE 8, the members 55 and 57 are swung relative to and past one another, as by manipulation of the flanges 62 and 64 serving as handles, and the members will then remain in such relative released position as held by engagement with the base of the channel. In this position, as shown, the lugs 53 are clear and below the interlock flanges 50 and the anchor member 28 can be freely shifted longitudinally relative to the channel for adjusting its position. Promptly upon lifting of the anchor member 28 into position to interlock the lugs 53 with the notches 54, the latching members 55 and 57 gravitationally swing into the latching, retaining holding up position relative to the anchor member, thus automatically latching the anchor member against leaving the adjusted position thereof relative to the channel until the members 55 and 57 are again relatively swung into releasing position.

While rotary take-up or tightening is provided for by the winch drum means 29 of the anchoring units 20, linear slack take-up and tightening, tensioning adjustment is afforded by the anchoring units 21 (FIGS. 2 and 4) by the provision of improved rugged turnbuckle type respective screw devices 65. Each of the anchoring assemblies 21 except for the chain-connecting and take-up turnbuckle devices 65, comprises a rugged anchor block 28 which is essentially the same as the anchor block 28 of the anchoring unit assemblies 20 so that a description of one suffices for the other and the same reference numerals indicate substantially identical parts.

Each of the turnbuckle take-up assemblies 65 comprises a lower end eyebolt 67 having its eye head engaged pivotally upon a bearing rod 68 (FIGS. 4, 9 and 10) which is secured at its opposite end portions to the walls 32 of the associated bearing block member 28, preferably provided with opposed aligned spaced reinforcing bosses 69 on their inner faces for this purpose.

Relatively linearly adjustably connecting the lower end eyebolt 67 with an upper end chain-attached eyebolt 70 is a tubular adjustment member or sleeve 71 having adjacent to its lower end an internal threaded annular land 72 threadedly engaging the shank of the lower eyebolt 67 and adjacent to its upper end an internal threaded annular land 73 which threadedly engages the upper eyebolt shank, it being understood that one of the eyebolts has a left-hand thread and the other of the eyebolts has a right-hand thread so that upon turning the adjustment sleeve 71 relative to the eyebolts in one direction causes the eyebolts to be protracted equally and turning of the sleeve in the opposite direction causes the eyebolts to be retracted equally for adjustment purposes. Such turning of the sleeve 71 is facilitated by the provision thereon of an external rigid integral collar 74 intermediate its length and preferably disposed slightly upward relative to its longitudinal center and provided with ratchet teeth 75 so that a complementary ratchet wrench can be applied for adjustment turning leverage on the sleeve.

Between the annular threaded lands 72 and 73, the sleeve 71 is of larger internal diameter than the shanks of the eyebolts to afford a limited cylindrical clearance for the end portions of respective stop pins 77 driven through suitable diametric bores 78 in the inner end portions of the shanks of the eyebolts 67 and 70 and serving to prevent inadvertent removal of the eyebolts from the sleeve 71 by engagement with respective stop shoulders 79 at the inner ends of the threaded lands of the sleeve defining the limit to which the eyebolts can be protracted. Assembly of the stop pins 77 is facilitated by a radial access hole 80 through the wall of the sleeve 71 about midway its length.

Figure 4:
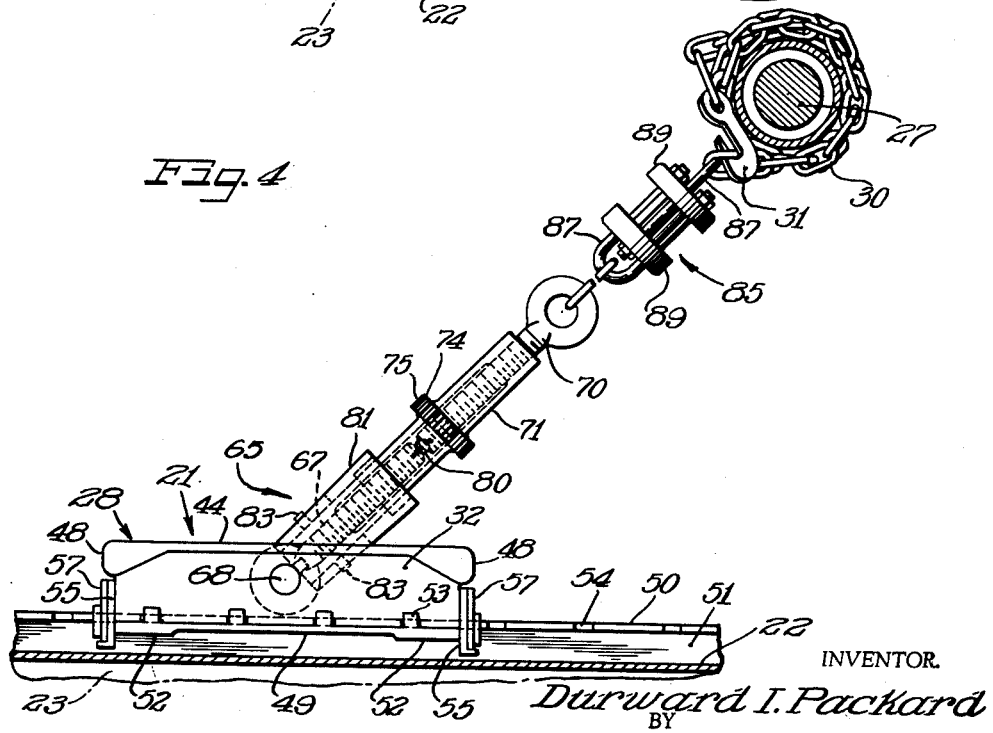
FIGURE 4 is an enlarged fragmentary sectional elevational detail view taken substantially on the line IV—IV of FIGURE 1.

One of the disadvantages of an ordinary turnbuckle in an anchoring device of the character described resides in tendency of the screw parts to loosen under the jarrings and vibrations inherent in running of the transporting rolling equipment. This problem has been successfully overcome in the take-up device 65 by the provision of a locking member 81 in the form of a sleeve relatively loosely engaged about the adjustment sleeve 71 between the head of the lower eyebolt 67 and the ratchet wheel collar 74. This sleeve is longitudinally diametrically slotted across and thus bifurcated to provide a pair of elongated opposed, cooperative furcation legs 82 having opposed inner faces spaced apart sufficiently to straddle and oppose the adjacent connecting neck portion of the eye of the lower bolt 67, and a pair of oppositely projecting aligned anti-rotation lugs 83 projecting rigidly from the lower end portion of the sleeve 71, while the lower end of the locking sleeve 81 engages against the attachment pin or rod 68 (FIGS. 4 and 8). Since in service the adjustment member 65 projects generally upwardly, gravitational bias of the locking sleeve 81 is sufficient to maintain it in its locking position. As best seen in FIGURES 10 and 12, clearance is afforded by the width of the slot between the locking legs 82 for a limited range of angular relative displacement of the sleeve lugs 83 with respect to the eye head of the bolt 67 to facilitate making adjustments and to afford easy manipulation, but no appreciable loosening relative turning of the lock bolt and sleeve is permitted and thus the adjustment unit 65 is held substantially against loosening in service.

When it is desired to inactivate the locking sleeve 81, it is axially moved toward the ratchet gear collar 74 until its lower end is axially inwardly clear of the interlock lugs 83, it being observed that the length of the sleeve is less than the distance between the opposing faces of the collar 74 and the lugs 83 for this purpose. After such axial displacement of the locking sleeve 81, it is given a quarter turn until the ends of the legs 82 oppose the lugs 83 as retaining stops to hold the sleeve against returning to its locking relationship, whereby to enable free rotary adjustment movements of the adjustment sleeve 71 relative to the eyebolts. In order to retain the locking sleeve 81 against unintentional displacement from the inactive position, respective endwise opening, socket notches 84 are provided in the free ends of the locking sleeve legs 82 within which the lugs 83 are engaged, as best seen in FIGS. 10 and 11. Release of the locking sleeve 81 from the lugs 83 for reactivation is readily effected by limited axial movement of the sleeve 81 toward the ratchet collar 74 to clear the ends of the legs 82 from the lugs 83 and then a quarter turn of the sleeve to reorient it for locking reception of the lugs 83 and the head of the lower eyebolt 87 between the legs 82, the lugs 83 having been generally aligned with the axial plane of the bolt head during the take-up adjustment of the device 65.

In order to enable tensioning of the flexible connections afforded by the chains 30 of the tie-down devices, and to absorb shocks in service, each of the chains 30 has connected into it and forming part of the flexible connection a combination tensioning and shock absorbing device 85 (FIGS. 1–4 and 3–16). In a simple, rugged and efficient construction, each of the devices 85 comprises a pair of preferably identical U-bolts 87 which are disposed in the assembly on a common axis with the legs directed toward one another and with the yokes directed away from one another and in crossing planes and adapted to serve as links of the flexible connection by being interlinked with respective spaced links of the chain 30. Nuts 88 are threaded onto the free end portions of the legs of the U-bolts 87 retain them in assembly with opposed preferably identical compression disk plates 89 between which is mounted for axial compression a compression member 90 in a desirable form comprising an elastomeric block formed from any suitable elastomeric material of suitable durometer and which will be generically referred to as rubber.

Each of the compression disks 89 has four equidistantly spaced bolt leg clearing holes 91 therethrough so that all four legs of the two U-bolts extend through both of the compression plates, with the retaining nuts 88 engageable with the respective back or outer faces of the compression plates. Through this arrangement, the legs of the U-bolts 87 passing through the compression plates 89, and the compression plates cooperate to provide a cage within which the compression body member 90 is retained.

Figure 14:
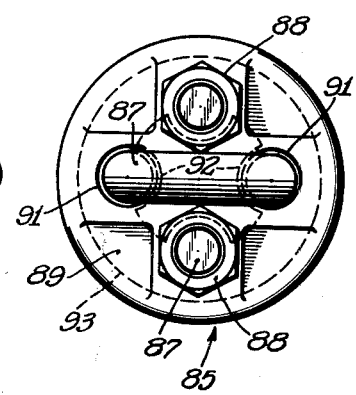
FIGURE 14 is an end elevational view of the tension member looking toward the left of FIGURE 13.
Figure 15:
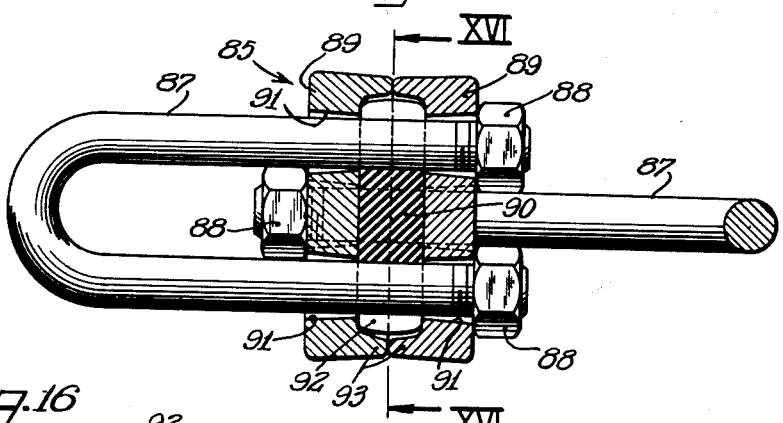
FIGURE 15 is a longitudinal sectional view through the tension member showing the same in fully compressed condition.
Figure 16:
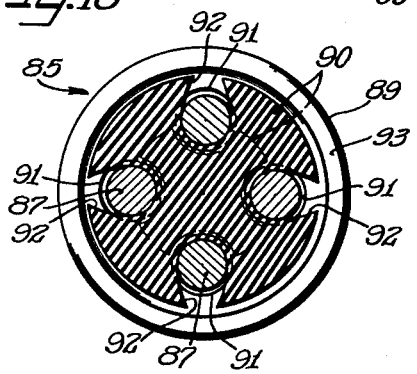
FIGURE 16 is a sectional detail view taken substantially on the line XVI—XVI of FIGURE 15.

In order to increase the volume of the rubber compression member 90 within a compact relationship of the cage afforded by the U-bolt legs, longitudinal clearance grooves 92 are molded in the perimeter of the rubber compression member 90, whereby the perimeter of the compression member projects between the adjacent legs of the U-bolts, as best seen in FIGURES 14 and 16. It will also be observed that in the uncompressed condition of the member 90 its diameter is substantially less than the inside diameter of respective opposed coaxial stop flanges 93 provided on the inner sides of the compression disks 89. These relative diameters are predetermined in respect to the volume of the rubber compression member 90 to enable edgewise stopping abutment of the flanges 93 under extreme compression loads to protect the compression member 90 against rupturing overcompression. At the extreme compression limit defined by the protective stop flanges 93, as shown in FIGURES 15 and 16, those portions of the compression member projecting generally as peripheral longitudinal ribs between the grooves 92 guide the rubber material of the compression member substantially uniformly in radial flow pattern into the area between the legs of the U-bolts and the spaced inner surfaces of the stop flanges 93 which, as shown, are tapered outwardly to afford maximum compression clearance for the expanded flow ribs of the compressed member and to avoid any danger of pinching the adjacent rubber perimeter. Under normal operating conditions, such bottoming, stopping engagement of the stop flanges 93 will occur quite infrequently, if at all, but must be taken into acount as a safety factor to avoid damage to the rubber compression member under unusual conditions.

During tie-down of the load, the respective chains 30 are drawn up under tension, with the respective tensionable devices 85 serving as tensioning springs. By virtue of the substantial length of the rubber compression body 90 in each of the devices 85, substantial shock absorbing compression and expansion range is afforded between the compression end disks 89 to the extreme safety limit determined by abutment of the stop ring flanges 93.

If preferred, certain or all of the flexible connections of the anchoring assemblies 20 and 21 may be provided with auxiliary grab hooks 94 as shown in FIGURE 3, to facilitate taking up slack in the chain. It will also be appreciated that the two types of the tie-down assemblies 20 and 21 afford substantial range of service adaptabilities in respect to heavy duty tie down requirements, afford desirable take-up characteristics, and afford numerous safety features including assurance against loosening or displacement of the anchoring devices and improved tensioning and shock absorbing functions.

It will be understood that modifications and variations may be effected without departing from the scope of the novel concepts of the present invention.

I claim as my invention:

1. Apparatus adapted for anchoring automotive vehicles to a transportation vehicle having a supporting floor, an elongated channel member adapted to be secured fixedly to the transportation vehicle floor and having spaced apart upstanding side walls and inwardly directed opposed spaced interlock flanges provided with aligned pairs of substantially uniformly spaced notches in their free margins, a rigid elongated anchor member comprising a frame having side walls rigidly connected by end bars and with the side walls spaced to fit between the facing edges of said interlock flanges, said side walls of said anchor member having lower marginal elongated outwardly projecting anchoring flanges freely spaced from said upstanding side walls of the channel and opposingly underlying the interlock flanges, said side walls of said anchor member and said anchoring flanges having lower limited area contact pad portions engageable with the base of the channel for sliding the anchor member longitudinally along the channel to various adjusted positions, aligned pairs of anchoring lugs extending integrally outwardly of the respective side walls of said anchor member and upwardly of the contiguous anchoring flanges, affording reinforcement for the anchoring flanges and being complementary to and spaced in conformity with said notches for engagement in said notches to anchor the anchor member against longitudinal displacement from adjusted position relative to the channel, said anchoring flanges and anchoring lugs being of a combined height less than the spacing of said channel flanges from the channel base so as to permit free longitudinal adjustment of the anchor member when said pads engage the base of the channel, and said side walls of said anchor member projecting substantially above the interlock flanges, and means for maintaining the anchor member releasably elevated in anchored relation of the lugs in selected ones of the interlock flange notches, and flexible connecting means attached to the anchor member between said side walls of said anchor member for connecting the same to an automotive vehicle to be anchored.

2. Apparatus as defined in claim 1, wherein the means for maintaining the anchor members releasably elevated comprise safety hold up means pivoted to said end bars of said anchor member for uniformly holding the anchor member elevated to maintain said anchoring lugs engaged in said notches and releasable to enable disengagement of the lugs from the notches for accommodating adjustment of the anchor member longitudinally of the channel member.

3. Apparatus adapted for anchoring automotive vehicles to a transportation vehicle having a supporting floor, an elongated channel member adapted to be secured fixedly to the transportation vehicle floor and having spaced apart upstanding side walls and inwardly directed opposed spaced interlock flanges having facing edges and provided with aligned pairs of substantially uniformly spaced notches opening through the facing edges thereof, a rigid elongated anchor member comprising a frame having side walls rigidly connected by end bars and with the side walls spaced to fit between the facing edges of said interlock flanges, said side walls of said anchor member having lower marginal elongated outwardly projecting anchoring flanges freely spaced from said upstanding side walls of the channel and opposingly underlying the interlock flanges, said side walls of said anchor member and said anchoring flanges having lower limited area contact pad portions engageable with the base of the channel facilitating sliding of the anchor member longitudinally along the channel to various adjusted positions, aligned pairs of anchoring lugs extending integrally outwardly on the respective side walls of said anchor member and upwardly of the contiguous anchoring flanges and affording reinforcement for the anchoring flanges and being complementary to and spaced in conformity with said notches for engagement in said notches to anchor the anchor member against longitudinal displacement from adjusted position relative to the channel, said anchoring flanges and lugs being of a combined height less than the spacing of said interlock flanges from the channel base so as to permit free longitudinal adjustment of the anchor member when said pads engage the base of the channel, said side walls of said anchor member projecting substantially above the interlock flanges and having upper marginal reinforcing ribs having end projections beyond the adjacent ends of the member and providing bumpers, means for maintaining the anchor member releasably elevated in anchored relation with the anchoring lugs in selected ones of the interlock flange notches, flexible connecting means for attaching the anchor member to an automotive vehicle to be anchored and including:
 take-up means,
 and means pivotally attaching the take-up means between said side walls of said anchor member substantially longitudinally centered in respect to said anchor member so that upward pull on the anchor member draws it and thereby said anchoring flanges uniformly up against the interlock flanges.

4. Apparatus for anchoring automotive vehicles to transporting vehicle including a floor, an elongated channel adapted to be fixedly secured to the floor having upstanding side walls and inwardly directed spaced apart anchoring flanges provided with free marginal aligned notches, a rigid anchor member fitting between the edges of said flanges for free longitudinal adjustment movement and having interlock lug and flange means on lower outer margins thereof adapted to be clear of said flanges in a lowered position of the member and adapted to engage the lugs within said notches and said member flanges under said channel flanges in a raised position of the member, flexible connecting means attached to the member and adapted to be attached to a vehicle to be anchored, and a hold-up device at each end of said body comprising in each instance a swingable latch member and a swingable locking member with a foot flange portion on the latching member engageable below the associated end of the anchor member with the base of the channel to hold the locking member against escape of the lugs from the notches in any adjusted position of the locking member in the channel and the locking member engaging said foot flange to retain the latching member against unintentional release from said depending anchor member holding-up position.

5. Apparatus for anchoring automotive vehicles to transporting vehicle including a floor, an elongated channel adapted to be fixedly secured to the floor having upstanding side walls and inwardly directed spaced apart anchoring flanges provided with free marginal aligned notches, a rigid anchor member fitting between the edges of said flanges for free longitudinal adjustment movement and having interlock lug and flange means on lower outer margins thereof adapted to be clear of said flanges in a lowered position of the member and adapted to engage the lugs within said notches and said member flanges under said channel flanges in a raised position of the member, flexible connecting means attached to the member and adapted to be attached to a vehicle to be anchored, and a hold-up device at each end of said body comprising in each instance a swingable latch member and a swingable locking member with a foot flange portion on the latching member engageable below the associated end of the anchor member with the base of the channel to hold the locking member against escape of the lugs from the notches in any adjusted position of the locking member in the channel and the locking member engaging said foot flange to retain the latching member against unintentional release from said depending anchor member holding-up position, said latching and locking members being releasable by swinging them into relative crossing relation.

6. Tie down apparatus of the character described comprising a rigid anchoring body and a flexible connecting structure for attachment of the body to an object to be transported, said structure including a take-up device comprising a pair of eyebolts in alignment and with the eye heads thereof projecting oppositely and a rotary sleeve threadedly connecting the eyebolts for relative longitudinal adjustment, the eye of one of said bolts being pivotally connected to said anchoring body, said sleeve having lug means adjacent to said one eyebolt, and a longitudinally movable locking sleeve encompassing the rotary sleeve adjacent to said one eyebolt and having means thereon releasably engageable with said lug means and with the head of said one eyebolt to lock the rotary sleeve against any substantial rotation relative to said one eyebolt.

7. Tie down apparatus of the character described comprising a rigid anchor body and a flexible connecting structure for attachment of the body to an object to be transported, said structure including a take-up device comprising a pair of eyebolts in alignment and with the eye heads thereof projecting oppositely and a rotary barrel threadedly connecting the eyebolts for relative longitudinal adjustment, the eye of one of said bolts being connected to said anchor body, said barrel having lug means adjacent to said one eyebolt, and a longitudinally movable locking member carried by the barrel adjacent to said one eyebolt and having furcations thereon releasably engageable with said lug means and with the head of said one eyebolt to lock the barrel against any substantial rotation relative to said one eyebolt.

8. Tie down apparatus of the character described comprising a rigid anchor body and a flexible connecting structure for attachment of the body to an object to be transported, said structure including a take-up device comprising a pair of eyebolts in alignment and with the eye heads thereof projecting oppositely and a rotary barrel threadedly connecting the eyebolts for relative longitudinal adjustment, the eye of one of said bolts being connected to said anchor body, said barrel having lug means adjacent to said one eyebolt, and a longitudinally movable locking sleeve encompassing the barrel adjacent to said one eyebolt and having means thereon releasably engageable with said lug means and with the head of said one eyebolt to lock the barrel against any substantial rotation relative to said one eyebolt, said barrel having a ratchet wheel shoulder thereon spaced from said lug means and said locking sleeve being of a length to be moved into released position between said lug means and said collar, said locking sleeve having on its end adjacent the head of said one eyebolt socket means within which said lug means can be engaged to retain the locking sleeve inactive during adjustment movements of said barrel.

9. Tie down apparatus of the character described comprising a rigid anchoring member and a flexible structure attached to the anchoring member and adapted to be attached to an object to be transported on a freight vehicle, said structure including take-up means and a tensioning device comprising:

means defining a retaining and compression cage and including opposed compression members, and an elastomeric body compressibly disposed in the cage between said compression members.

10. Tie down apparatus of the character described comprising a rigid anchoring member and a flexible structure attached to the anchoring member and adapted to be attached to an object to be transported on a freight vehicle, said structure including take-up means and a tensioning device comprising:

a pair of opposed U-bolts serving as links in the flexible structure, a pair of compression disks with the legs of the U-bolts extending therethrough, retaining nuts on the ends of the legs of the U-bolts engaging the outer faces of the compression disks, said U-bolt legs and the compression disks defining a retaining cage, and an elastomeric body retained within said cage and resisting movement of the compression members toward one another upon separating pull on said U-bolts.

11. Tie down apparatus of the character described comprising a rigid anchoring member and a flexible structure attached to the anchoring member and adapted to be attached to an object to be transported on a freight vehicle, said structure including take-up means and a tensioning device comprising:

a pair of opposed U-bolts serving as links in the flexible structure, a pair of compression disks with the legs of the U-bolts extending therethrough, retaining nuts on the ends of the legs of the U-bolts engaging the outer faces of the compression disks, said U-bolt legs and the compression disks defining a retaining cage, and an elastomeric body retained within said cage and resisting movement of the compression members toward one another upon separating pull on said U-bolts, said U-bolt legs affording spaces therebetween and said body having longitudinal ribs on its perimeter projecting between the U-bolt legs and providing flow guiding means for the elastomeric body under compression.

12. Tie down apparatus of the character described comprising a rigid anchoring member and a flexible structure attached to the anchoring member and adapted to be attached to an object to be transported on a freight vehicle, said structure including take-up means and a tensioning device comprising:

a pair of opposed U-bolts serving as links in the flexible structure, a pair of compression disks with the legs of the U-bolts extending therethrough, retaining nuts on the ends of the legs of the U-bolts engaging the outer faces of the compression disks, said U-bolt legs and the compression disks defining a retaining cage, and an elastomeric body retained within said cage and resisting movement of the compression members toward one another upon separating pull on said U-bolts, said U-bolt legs affording spaces therebetween and said body having longitudinal ribs on its perimeter projecting between the U-bolt legs and providing flow guiding means for the elastomeric body under compression, said compression disks having peripheral opposed stop flanges and the volume of said elastomeric body being predetermined to be clear radially inwardly of the stop flanges in the maximum compressed condition as defined by abutment of the stop flanges.

References Cited in the file of this patent

UNITED STATES PATENTS

| | | |
|---|---|---|
| 2,024,444 | Friedlaender | Dec. 17, 1935 |
| 2,673,632 | Stiranka | Mar. 30, 1954 |
| 2,913,267 | Johnson | Nov. 17, 1959 |
| 3,092,368 | McDowell | June 4, 1963 |
| 3,120,375 | Haynes | Feb. 4, 1964 |

UNITED STATES PATENT OFFICE
CERTIFICATE OF CORRECTION

Patent No. 3,140,850                 July 14, 1964

Durward I. Packard

It is hereby certified that error appears in the above numbered patent requiring correction and that the said Letters Patent should read as corrected below.

In the grant, line 3, and in the heading to the printed specification, line 5, for "Delaware" read -- Illinois --.

Signed and sealed this 1st day of December 1964.

(SEAL)
Attest:

ERNEST W. SWIDER
Attesting Officer

EDWARD J. BRENNER
Commissioner of Patents